United States Patent [19]

Odaira

[11] Patent Number: 5,546,589
[45] Date of Patent: Aug. 13, 1996

[54] SYSTEM HAVING CONTROLLED POWER SUPPLY FOR PROHIBITING THE POWER ON SWITCH FROM BEING TURNED ON AND ACCESSING MEMORY WHEN SUPPLY VOLTAGE FALLS BELOW SECOND PREDETERMINED VOLTAGE

[75] Inventor: Isao Odaira, Inagi, Japan

[73] Assignee: Canon Kabushiki Kaisha, Tokyo, Japan

[21] Appl. No.: 387,621

[22] Filed: Feb. 13, 1995

Related U.S. Application Data

[63] Continuation of Ser. No. 786,604, Nov. 1, 1991, abandoned.

[30] Foreign Application Priority Data

Nov. 9, 1990 [JP] Japan .................................. 2-302675

[51] Int. Cl.$^6$ ..................................................... G06F 1/30
[52] U.S. Cl. ................. 395/750; 395/182.12; 364/948.4; 364/948.5; 364/273.4; 364/273.5; 364/285; 364/DIG. 1
[58] Field of Search .................................. 395/750, 575, 395/550, 182.12; 365/226, 228, 229; 371/66; 364/DIG. 1, DIG. 2; 354/484, 468, 412; 307/66, 64, 150, 362

[56] References Cited

U.S. PATENT DOCUMENTS

| 4,096,560 | 6/1978 | Footh | 364/200 |
|---|---|---|---|
| 4,422,163 | 12/1983 | Oldenkamp | 365/229 |
| 4,438,431 | 3/1984 | Toyomura | 340/663 |
| 4,509,843 | 4/1985 | Hasegawa | 354/412 |
| 4,551,841 | 11/1985 | Fujita | 371/66 |
| 4,645,326 | 2/1987 | Kiuchi et al. | 354/484 |
| 4,766,567 | 8/1988 | Kato | 364/900 |
| 4,777,626 | 10/1988 | Matsushita et al. | 635/226 |
| 4,831,406 | 5/1989 | Seki | 354/484 |
| 5,007,027 | 4/1991 | Shimoi | 365/229 |
| 5,053,804 | 10/1991 | Odaka et al. | 354/484 |
| 5,079,583 | 1/1992 | Sato | 354/435 |
| 5,157,270 | 10/1992 | Sakai | 307/66 |
| 5,218,607 | 6/1993 | Saito et al. | 371/66 |
| 5,237,698 | 8/1993 | Ohmae | 395/750 |
| 5,243,577 | 9/1993 | Ueda et al. | 365/229 |
| 5,349,669 | 9/1994 | Arai et al. | 395/750 |
| 5,375,246 | 12/1994 | Kimura et al. | 395/750 |

FOREIGN PATENT DOCUMENTS

| 273322 | 7/1988 | European Pat. Off. . |
|---|---|---|
| 638867 | 5/1990 | France . |

OTHER PUBLICATIONS

"Loose Connector Detection" by R. C. Mattern; IBM Technical Disclosure Bulletin; vol. 15, No. 1, Jun. 1972; pp. 33–33A.

*Primary Examiner*—Meng-Ai An
*Attorney, Agent, or Firm*—Fitzpatrick, Cella, Harper & Scinto

[57] ABSTRACT

The power supply of electronic apparatus is controlled according to the operational state of a power on switch and a power off switch. A first detector detects that the power supply voltage falls below a first predetermined voltage and a second detector detects that the power supply voltage falls below a second predetermined voltage. A device produces the same operational state as that in which the power off switch is actuated in response to the detection output of the first detector and prohibits the operation of the power on switch in response to the detection output of the second detector. A predetermined protection process is performed when the power supply voltage falls below a prescribed voltage in which the supply voltage is compared with the two predetermined voltages to produce the same state as when the power on or the power off switch is put into a predetermined condition in response to the comparison result.

14 Claims, 11 Drawing Sheets

SYSTEM HAVING CONTROLLED POWER SUPPLY FOR PROHIBITING THE POWER ON SWITCH FROM BEING TURNED ON AND ACCESSING MEMORY WHEN SUPPLY VOLTAGE FALLS BELOW SECOND PREDETERMINED VOLTAGE

This application is a continuation of application Ser. No. 07/786,604 filed Nov. 1, 1991, now abandoned.

BACKGROUND OF THE INVENTION

1. Field of the Invention

The present invention relates to measures to be taken in an electronic apparatus having a battery as a power supply when the battery voltage falls.

2. Description of the Prior Art

Conventional electronic apparatus driven by a battery as a power supply, such as an electronic learning machine, an electronic notebook or a word processor, have a reset IC for detecting the state of the battery to prevent data destruction, and controls the battery by the following two methods when the voltage of the battery is lowered:

1) protecting a RAM by an interrupt process in response to an output signal of the reset IC; and 2) comparing the battery voltage with a predetermined reference voltage at regular intervals by timer interrupts, and issuing a warning to replace the battery when the battery voltage becomes lower than a predetermined voltage.

However, in the above method 1), since the interrupt process can occur at any moment, a data updating process and the interrupt process are complicated. In method 2), the timer interrupt process and switchover process from the timer interrupt process to a RAM protection process are complicated, the adjustment of a comparison circuit for the voltage comparisons is necessary, and the cost is high.

Furthermore, method 2) needs an input port for monitoring the battery voltage which is sometimes difficult to realize the comparison circuit in a single chip microcomputer since the number of ports of the microcomputer may not be sufficient. In particular, an apparatus using a memory card or the like needs some input ports to monitor the state of predetermined signals of a bus between the battery and the card when memory protection is performed in accordance with the state of the battery, and such an apparatus is difficult to design.

SUMMARY OF THE INVENTION

It is a first object of the present invention to simplify protection processes when the battery voltage is lowered, and to certainly carry out the protection processes.

It is a second object of the present invention to simplify the production process and reduce the production cost by using an unregulated voltage detector (comparison circuit) in the above protection processes.

It is a third object of the present invention to produce an inexpensive apparatus without any special input port.

The invention is directed to electronic apparatus having a controllable power supply in which the power supply is controlled according to the operational state of a power on switch and a power off switch. The same control state as that in which the power off switch is actuated is produced upon detection that the power supply output falls below a first predetermined value and the operation of the power on switch is inhibited upon detection that the power supply output falls below a second predetermined value.

DETAILED DESCRIPTION OF THE PREFERRED EMBODIMENTS

The present invention will now be described in detail with reference to the illustrated embodiments. An electronic apparatus of the present invention is driven by a battery and has a plurality of IC cards as external storage means, at least a keyboard as a user interface means and a display.

Figure 1:
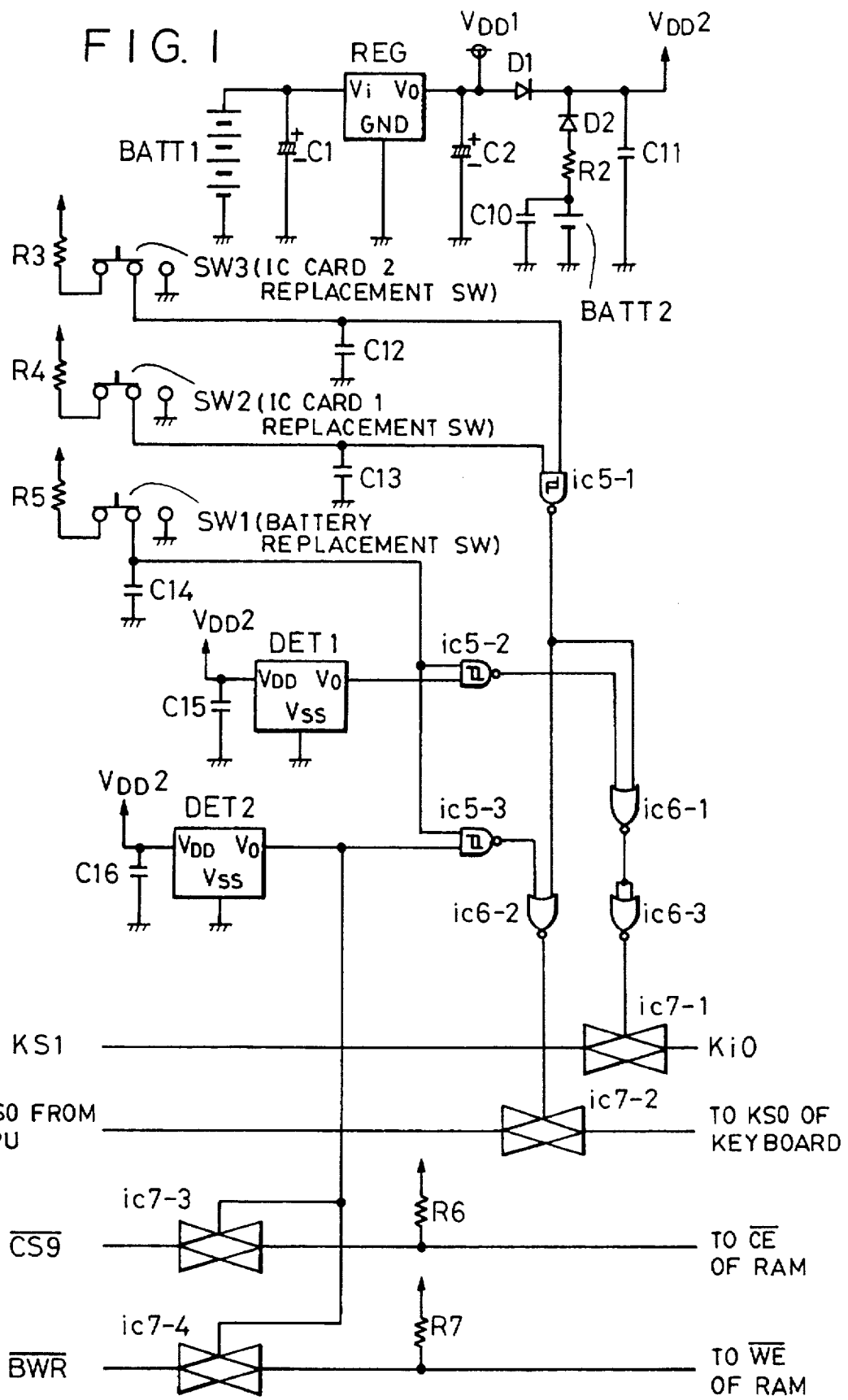
FIG. 1 is a circuit diagram of the periphery of a power supply in an electronic apparatus according to the present invention.

FIG. 1 shows a power supply portion and a circuit for performing control operations based on the detection of the supply voltage in the electronic apparatus. Referring to FIG. 1, BATT1, BATT2 and REG designate a battery serving as a power supply, a backup battery for a RAM, and a voltage regulator, respectively. The regulator REG is composed of a well-known integrated circuit and so on, stabilizes an output voltage of the battery BATT1, and outputs a fixed voltage VDD1.

Schottky barrier diodes D1 and D2 apply one of the VDD1 and the voltage of the battery BATT2 to generate a battery voltage VDD2.

Figure 4:
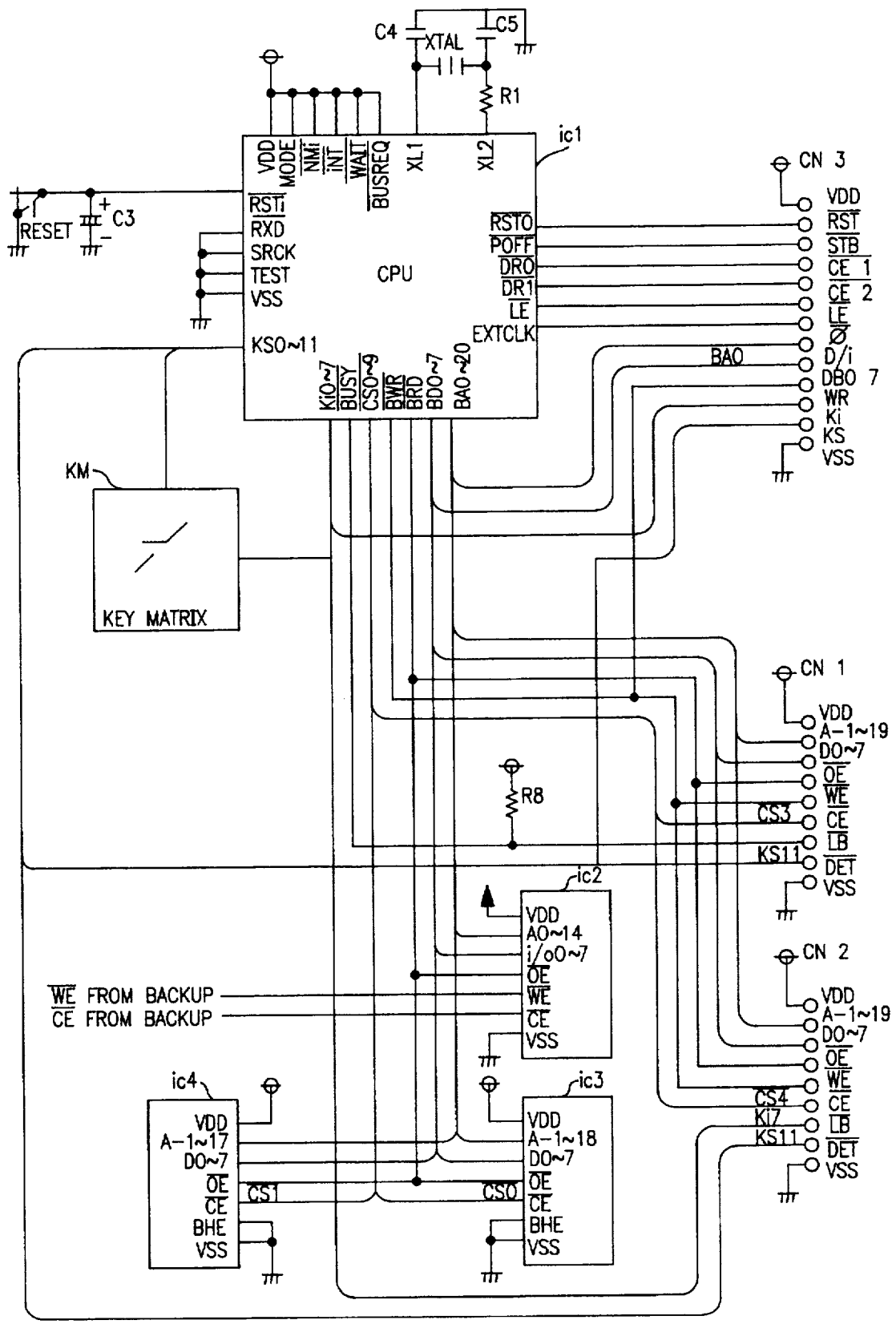
FIG. 4 is a block diagram of the periphery of a CPU and a memory.

The battery voltage VDD2 is supplied as a battery voltage of the circuit shown in FIG. 1 and a battery voltage of ic2 shown in FIG. 4.

Slide switches SW1, SW2 and SW3 are a battery replacement switch, an IC card 1 replacement switch, and an IC card 2 replacement switch, respectively. These switches are operated in mechanical relation to the replacement of the battery and the IC cards (or manual manipulation) and are shown positioned to the left in the figure.

Ic5 (ic5-1 to ic5-3) is a Schmitt-input NAND circuit to detect the operation states of the slide switches SW1, SW2 and SW3. Ic6 (ic6-1 to ic6-3) and ic7 (ic7-1 to ic7-4) are a NOR circuit and an analog switch, respectively.

Voltage detectors DET1 and DET2 each output a signal of 'L' level from a Vo terminal when the battery voltage VDD2 is lowered. The relation between detected voltages VDET1 and VDET2 of the voltage detectors DET1 and DET2 is VDET1>VDET2.

Ic5-1 outputs a signal of 'L' level to ic6-1 and ic6-2 only when both the switches SW2 and SW3 (the IC card replacement switches) are positioned to the left in the figure.

Ic5-2 and ic5-3 invert and transmit outputs of the voltage detectors DET1 and DET2 to ic6-1 and ic6-2 only when the switch SW1 (the battery replacement switch) is positioned to the left in the figure.

Ic6-1 and ic6-2 each output a signal of 'L' level only when outputs of both ic5-1 and ic5-3 are of 'H' level. Ic6-2 controls the analog switch ic7-2 in response to the output. Ic6-3 generates a signal obtained by inverting the output of ic6-1, and controls the analog switch ic7-1 in response to the signal.

The analog switches ic7-3 and ic7-4 are directly controlled by the output of the voltage detector DET2.

The analog switch ic7-1 is placed so as to connect a key strobe signal KS1 and a key input signal Ki0 (a key matrix will be specifically described below in reference to FIG. 2). The analog switch ic7-1 is forced into the same state as that in which an OFF key disposed between the key strobe signal KS1 and the key input signal Ki0 is pressed down.

The analog switch ic7-2 controls the connection of key strobe signals KS0 between a CPU and a key matrix, and prohibits the input of an ON key.

Ic7-3 and ic7-4 control lines for a chip select signal CS9 (negative logic) of a RAM and a write enable signal of the RAM, and are controlled so as to be closed by a 'H' level input and opened by a 'L' level input (high impedance state).

C1, C2, C10, C11, C17, C18 and C19 each designate a bypass capacitor, R2 designates a current limiting resistor, C12, C13, C14, C15 and C16 each designate a noise absorption bypass capacitor, and R6 and R7 each designate a pull-up resistor.

Figure 2:
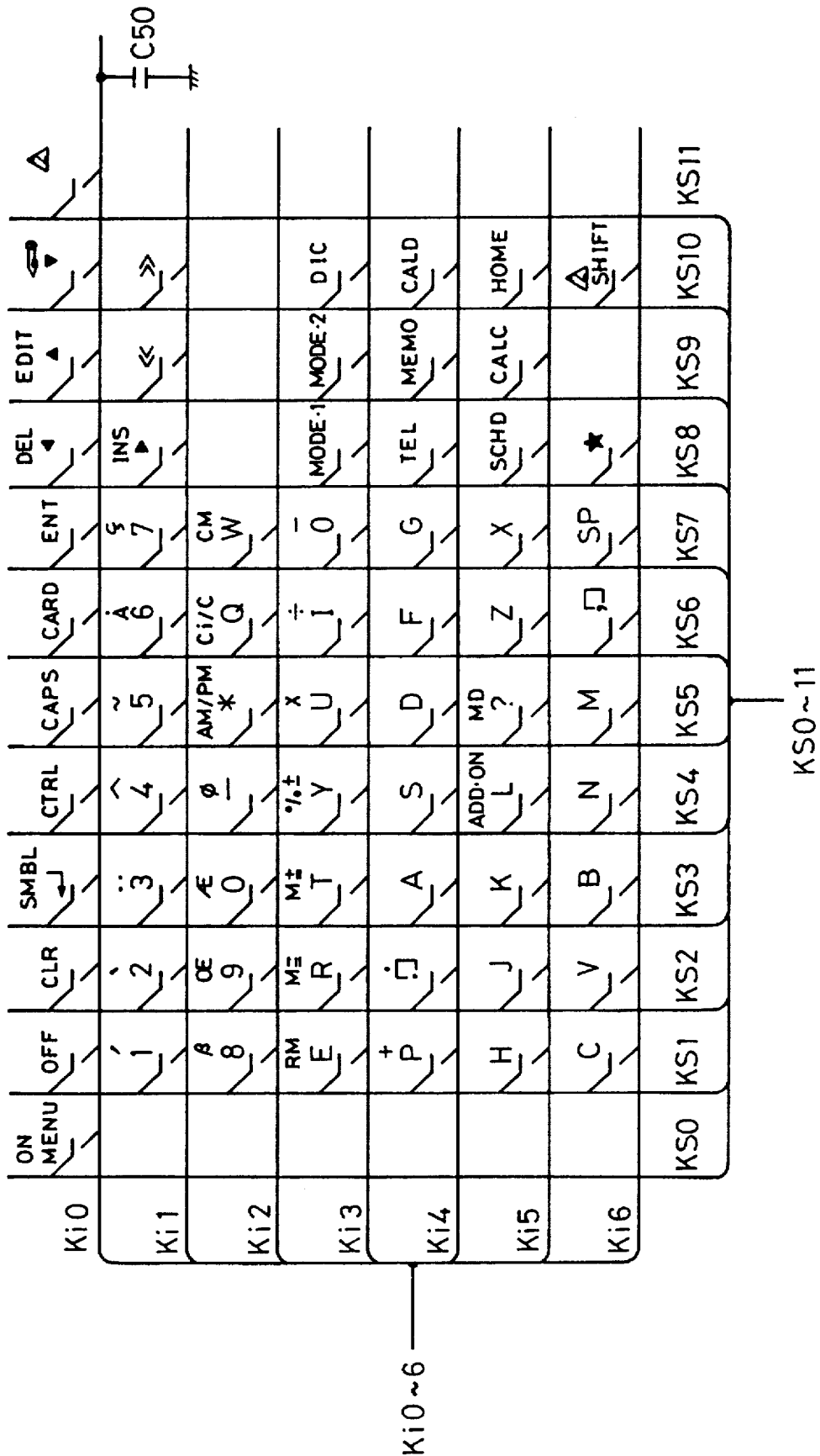
FIG. 2 is a diagram of explanatory view of a key matrix.

FIG. 2 shows a key matrix KM of the electronic apparatus of the present invention.

Referring to FIG. 2, Ki0 to Ki6 each denote a key input (scan) signal, and KS0 to KS11 each denote a key strobe signal.

The ON key is placed at an intersection of a key strobe signal key KS0 and a key input signal key Ki0, and the OFF key is placed at an intersection of a key KS1 and a key Ki0. These ON and OFF keys are used to control ON/OFF of the main power supply. The ON key also has a function of displaying a predetermined menu.

Figure 3:
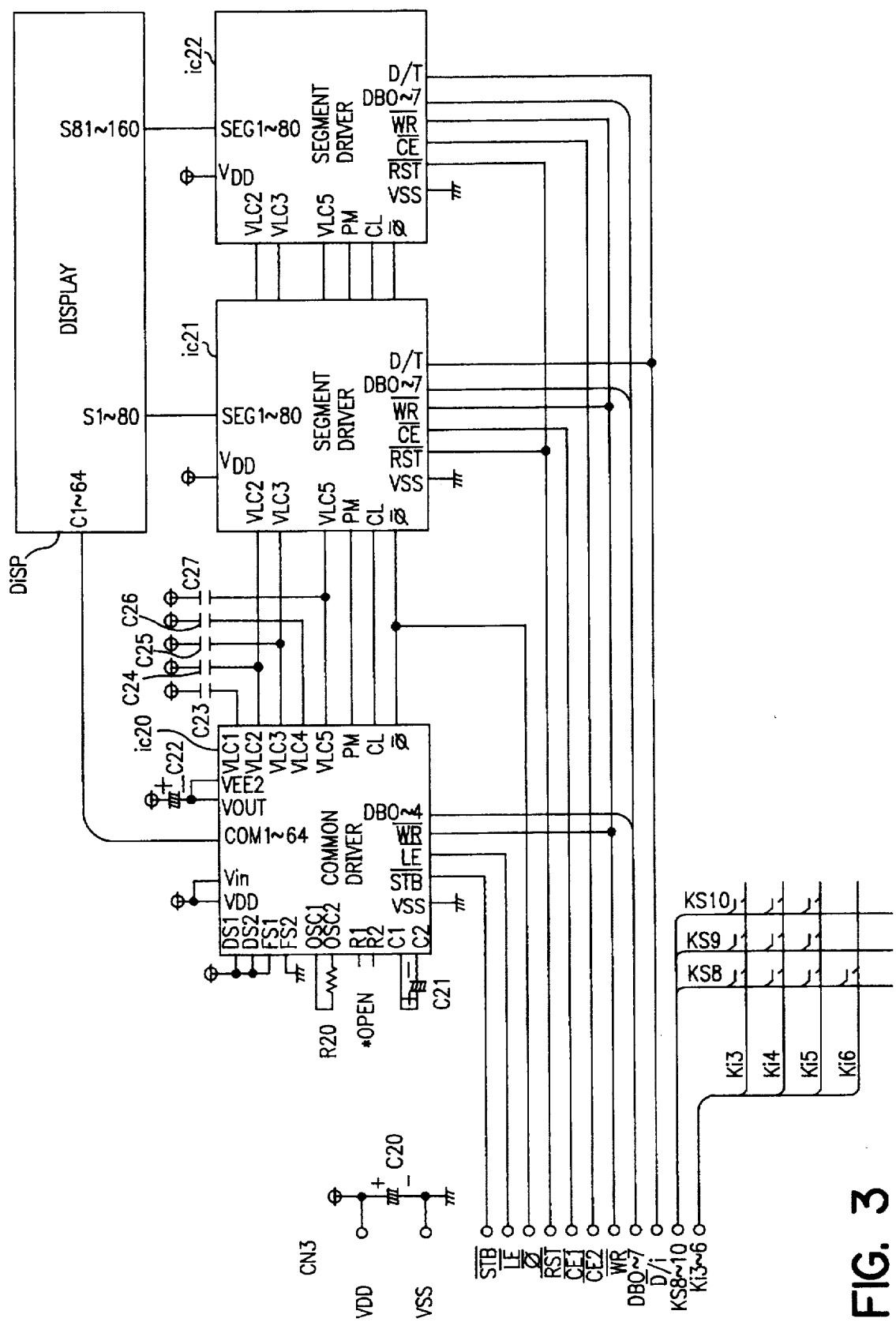
FIG. 3 is a block diagram of a display control circuit.

FIG. 3 shows a display circuit of the electronic apparatus of the present invention.

Referring to FIG. 3, ic20, ic21 and ic22, Disp, C20 to C30, and R20 designate a common driver for an LCD, LCD segment drivers, an LCD display, bypass capacitors, and a resistor for controlling the oscillation of the common driver ic20.

FIG. 4 shows a CPU and a memory circuit of the electronic apparatus of the present invention.

Referring to FIG. 4, a CPU ic1 controls the execution of processes of the electronic apparatus, and a RAM ic2 functions as a memory for data storage and work of the CPU.

ROMs ic3 and ic4 store a process program to be executed by the CPU ic1 and data for reference.

XTAL, C1 and C2, R1, R8, and C6, C7, C8 and C9 designate an oscillator for generating operational clocks for the CPU ic1, capacitors for compensating the phase of the clocks, a damping resistor, a pull-up resistor, and bypass capacitors, respectively.

C3, CN1 and CN2 designate a time constant capacitor for generating a reset signal of the electronic apparatus, a connector for the IC card 1, and a connector for the IC card 2.

KM represents the key matrix shown in FIG. 2.

Figure 5:
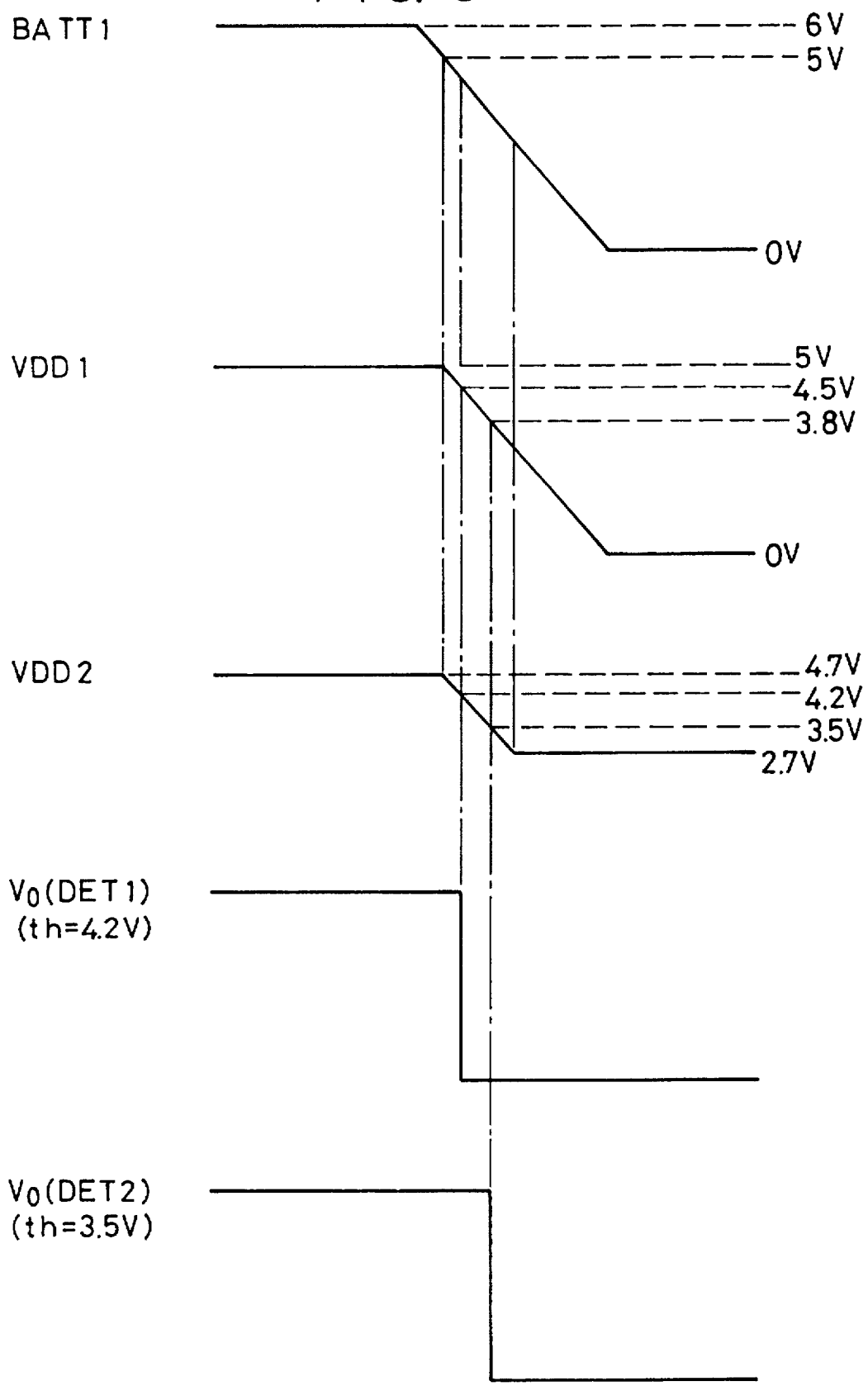
FIG. 5 is a timing chart of a battery voltage and main control signals.
Figure 6:
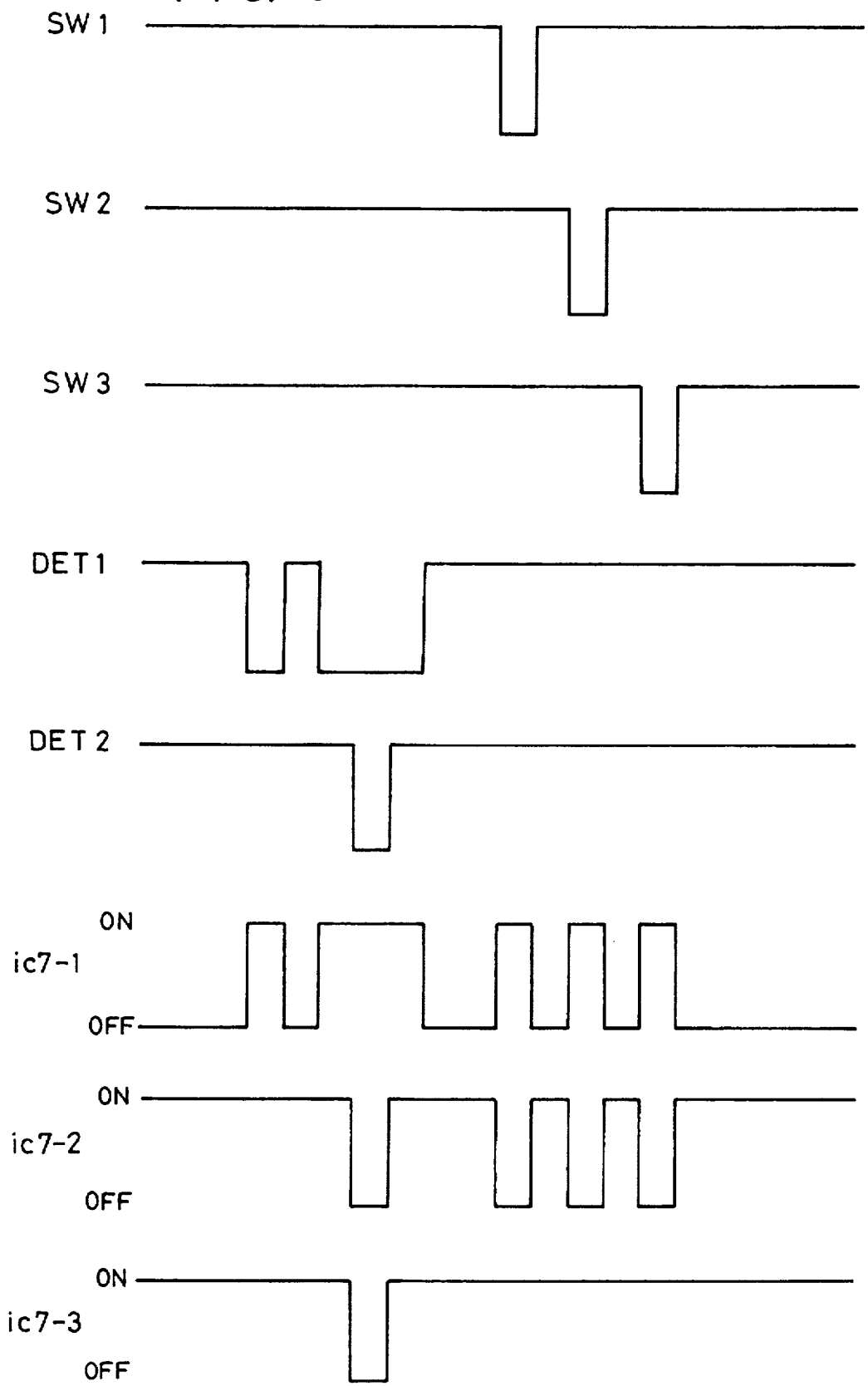
FIG. 6 is a timing chart of other main control signals.

FIGS. 5 and 6 each show the timing of main signals on the circuit shown in FIG. 1.

Referring to FIG. 5, when the voltage of the battery BATT1 is sufficiently high, the supply voltage VDD1 is set at a fixed voltage of 5 V by the regulator REG.

At this time, the supply voltage VDD2 through the diode D1 is 4.7 V which is approximately 0.3 V lower than the supply voltage VDD1.

Outputs of both the detectors DET1 and DET2 are of 'H' level.

When the voltage of the battery BATT1 falls below 5 V, the voltage of the battery BATT1 and VDD1 become almost the same and change together.

When the voltage VDD1 is lowered to approximately 4.5 V, each ic shown in FIGS. 3 and 4 reaches the lower limit of the operational voltage guaranteed by the manufacturer. At this time, VDD2 is approximately 4.2 V and the output of the detector DET1 is set to 'L' level.

Furthermore, when VDD1 and VDD2 reach approximately 3.8 V and 3.5 V, respectively, the output of the detector DET2 is also set to 'L' level.

FIG. 6 shows the relationships between the switches SW1 to SW3 and the DET1, and between the DET2 and control signals of ic7-1 to 7-3.

Referring to FIG. 6, if the switches SW1 to SW3 shown in FIG. 1 are positioned to the left and outputs of both the detectors DET1 and DET2 are of 'H' level, only the control signal of the analog switch ic7-1 is at the 'L' level, and the control signals of the analog switches ic7-2 and ic7-3 are at the 'H' level. Therefore, the analog switch ic7-1 is OFF and the analog switches ic7-2 and ic7-3 are ON.

When the supply voltage VDD2 drops down below 4.2 V shown in FIG. 5 and the output of only the detector DET1 is at the 'L' level, the control signal of the analog switch ic7-1 is at the 'H' level, the analog switch ic7-1 is put into the ON state, and the key strobe signal KS1 and the key input signal Ki0 shown in FIG. 1 are connected.

Furthermore, when the supply voltage VDD2 falls below 3.5 V shown in FIG. 5 and the outputs of both the detectors DET1 and DET2 go to the 'L' level, the control signals of the analog switches ic7-2 and ic7-3 go to the 'L' level, the analog switches ic7-2 and ic7-3 are put into the OFF state, the KS0s on the right and left in FIG. 1 are electrically opened (high impedance), and the chip select lines CS9 (on the side of the CPU) and CE (on the side of the RAM) are also opened.

Subsequently, when any of the switches SW1, SW2 and SW3 is positioned to the right while the outputs of the detectors DET1 and DET2 remain on 'H' level, that is, when any of the battery and the two IC cards is replaced, the analog switch ic7-1 is turned ON and the analog switch ic7-2 is turned OFF.

Since the OFF key is placed at an intersection of KS1 and Ki0 as shown in FIG. 2, if the analog switch ic7-1 is turned on, the same state as when the OFF key is pressed is produced.

When the analog switch ic7-2 is turned off, since KS0 shown in FIG. 2 is electrically opened, the ON key shown in FIG. 2 remains open even if pressed. In other words, the input of the ON key is ineffective in hardware.

Referring to FIG. 3, the display Disp performs display operations under the control of the drivers ic20, ic21 and ic22, and stops the display operations and goes into the standby state (ultra low current consumption mode) when a 'L' level input is applied as an STB signal from the CPU (ic1) shown in FIG. 4.

Figure 7:
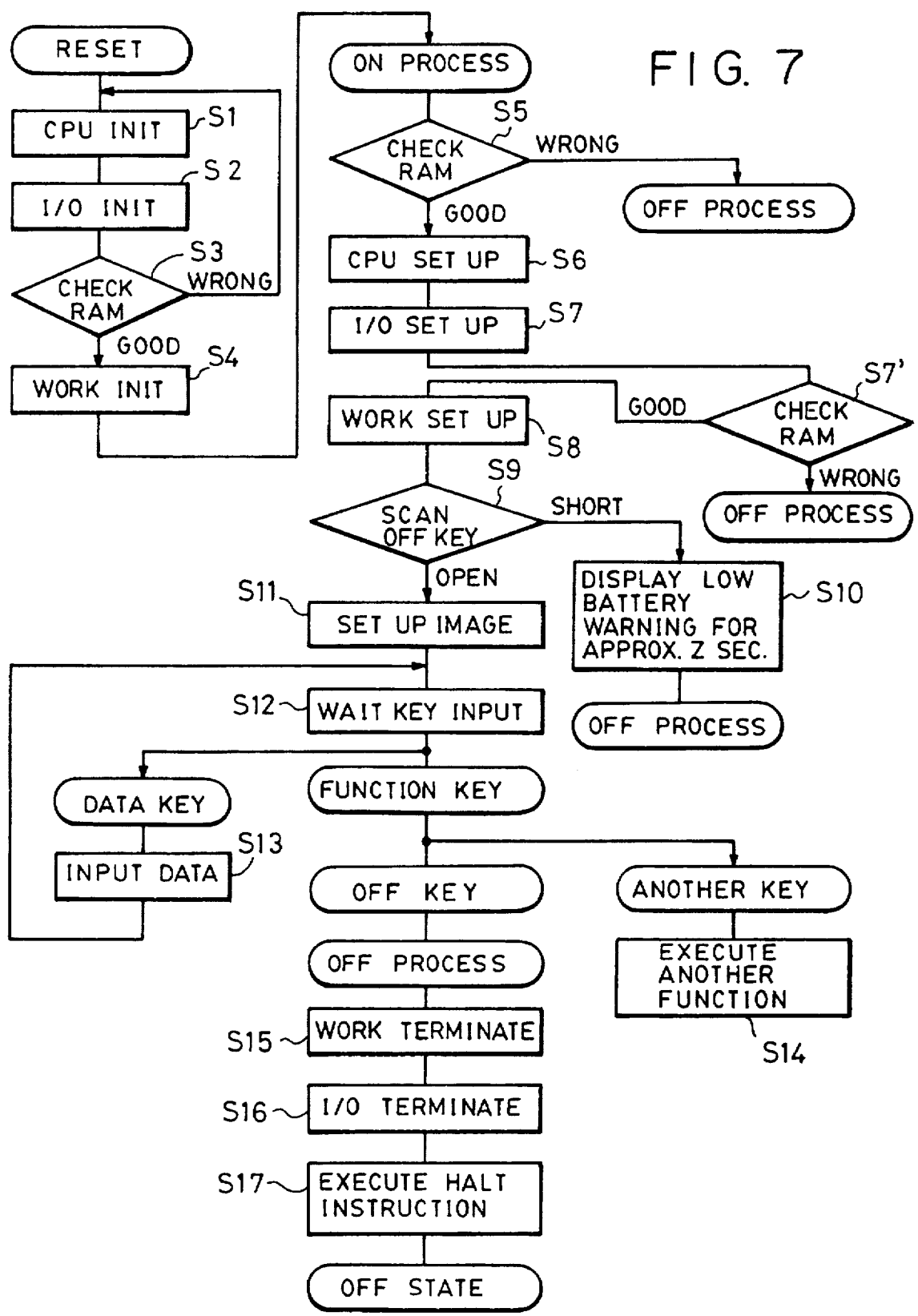
FIG. 7 is a flow chart showing control procedures of the CPU.

In FIG. 4, the processes to be carried out by ic1 are stored in ic3 or ic4. FIG. 7 is a flow chart of one of the processes.

WORK in the flow chart denotes a predetermined area of the RAM ic2, and I/O means an electronic circuit built in the CPU ic1 and the display circuit shown in FIG. 3.

Referring to FIG. 4, when a RESET key is pressed or when the battery BATT1 shown in FIG. 1 is inserted and a power ON reset signal is input to the CPU, the processes in FIG. 7 are carried out one by one from Step S1.

In Step S1, the register in the CPU and the interruption mode are initialized.

In Step S2, the circuit I/O built in the CPU and the display circuit shown in FIG. 3 are initialized.

In Step S3, it is checked whether or not the RAM can normally perform the access. If the RAM is normal (good), Step S4 is executed, and if the RAM is not normal (wrong), a reset operation is repeated in Step S1.

Figure 8:
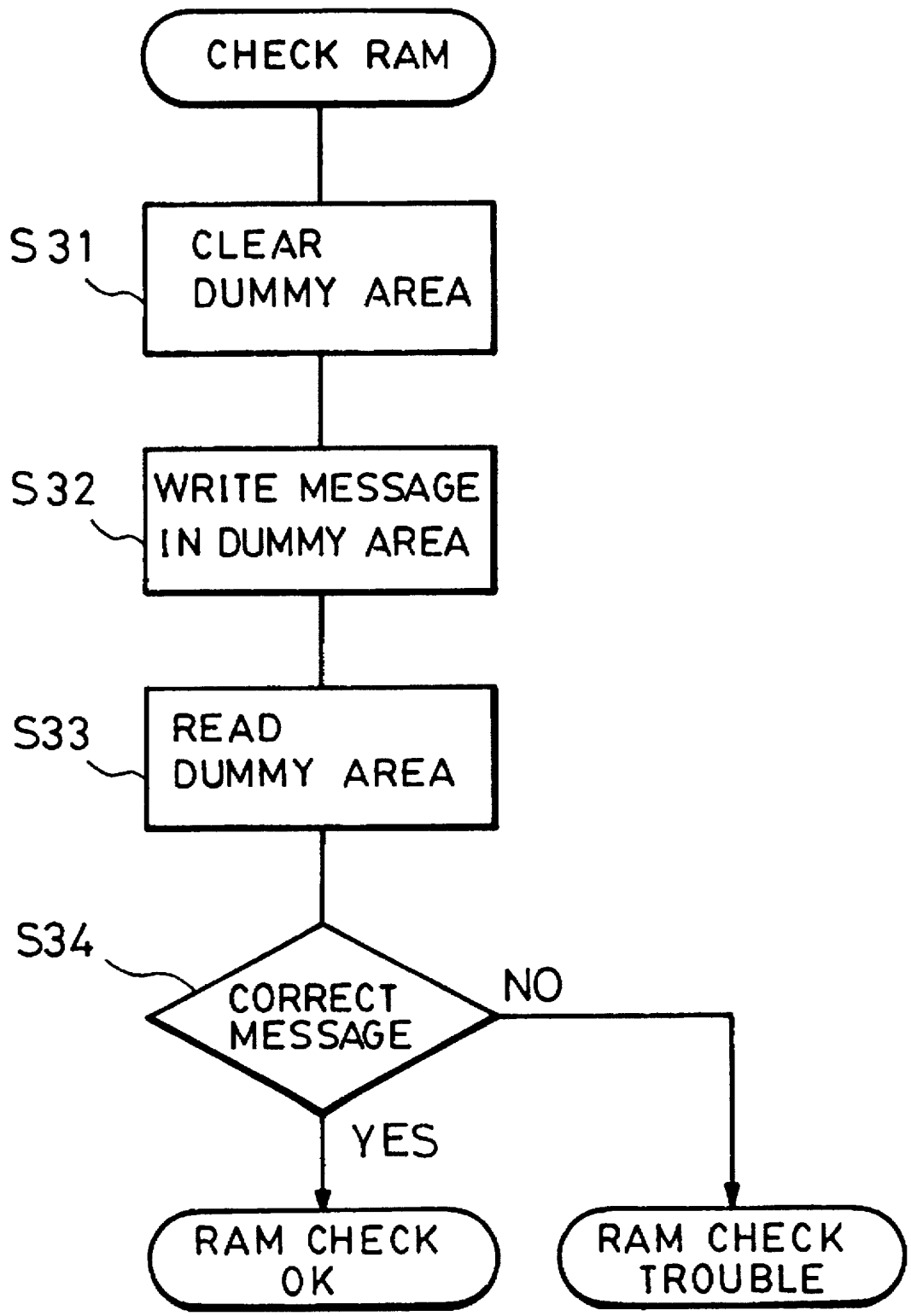
FIG. 8 is a detailed flow chart of a RAM check process.

The RAM check in Step S3 will now be described in more detail with reference to the flow chart shown in FIG. 8.

A predetermined area (several bytes) of the RAM is secured as a dummy area, and it is checked whether or not normal access to the dummy area of the RAM is possible.

First, in Step S31, the whole dummy area is cleared.

In Step S32, a predetermined message (for example, the name of the manufacturer or the name of the software) is written in the dummy area.

In Step S33, the dummy area is read.

In Step S34, it is determined whether or not the read data accords with the written data. If both the data are the same, it is determined that the RAM is normal. If the data do not agree, it is determined that there is something wrong in the RAM.

Returning to FIG. 7, the work area of the RAM is initialized in Step S4.

In Step S5, the RAM is checked in the same manner as in Step S3. If the RAM is not normal, an OFF process is executed, and if the RAM is normal, Step S6 is executed.

In Step S6, A set-up process of the CPU, for example, the minimum initialization of the register, is carried out.

In Step S7, a set-up process of the circuit I/O, the minimum initialization of the circuit I/O or the return to the state immediately before the OFF state of the circuit I/O is executed and Step S7' is executed. The RAM is checked in Step S7' in the same manner as above.

In Step S8, the work area of the RAM is initialized to a minimum.

In Step S9, the OFF key is scanned. If the OFF key is pressed, Step S10 is executed, and if the OFF key is not pressed, Step S11 is executed.

The press-down state of the OFF key is obtained through the analog switch ic7-1 not only when the OFF key is actually pressed down, but also when the supply voltage drops below 3.5 V as described above, and when the IC card or the battery is replaced.

If the OFF key is pressed, a message for indicating that the battery is running low (for example, "Low battery!") is displayed for approximately two seconds in Step S10 and the OFF process is executed.

In Step S11, a set-up image is displayed.

In Step S12, a wait for the key input by the key matrix shown in FIG. 2 is initiated. If the data key is pressed, Step S13 is executed, if one of keys other than the OFF key is pressed, Step S14 is executed, and if the OFF key is pressed, Step S15 is executed.

In Step S13, a data input process is performed and a wait for the key input in Step S12 is repeated.

In Step S14, a process corresponding to the pressed key other than the data key and the OFF key is performed. In Step S15, a terminate process (end process: process previous to OFF state) of the work area of the RAM is executed.

In Step S16, the terminate process of the circuit I/O is executed, and Step S17 is executed.

In Step S17, an interrupt enable operation of the CPU is performed and a halt instruction is executed, thereby putting the apparatus into the OFF state.

The OFF state of the apparatus of the present invention means the state in which the CPU stops the generation of clocks and goes into the standby state (ultra low current consumption mode), the STB signal of the display circuit shown in FIG. 3 is turned to 'L' and the display circuit is on standby.

When the RESET key shown in FIG. 4 is pressed in this state, the above processes are repeated from Step S1.

Furthermore, when the ON key shown in FIG. 2 is pressed in this OFF state, the processes subsequent to Step S5 are executed again.

In the above embodiment, since the voltage detectors DET1 and DET2 for detecting the supply voltage are mounted, the detected voltage of the voltage detector DET1 is set higher than that of the detector DET2, the OFF key is actuated in response to the output of the detector DET1, and the input of the ON key and the access to the RAM are prohibited in response to the output of the detector DET2, the configuration of the apparatus is simpler than the conventional one in which the CPU detects the voltage by using the input port.

Furthermore, the replacement of the IC card and the batteries is detected by the switches SW1 to SW3, the ON and OFF keys are controlled in accordance with the replacement, and the RAM can be reliably and easily protected.

Still further, according to the above configuration, since unregulated voltage detectors can be used, it is possible to greatly improve the production efficiency and to produce a relatively inexpensive apparatus compared to apparatus using a reset IC and the like.

Since the access state of the memory is checked in the reset process when the system is started, and the reset process is repeated until the normal access becomes possible, even if the battery voltage is lowered, the RAM can be certainly protected and incorrect operations of the system due to the protection of the RAM can be prevented by replacing the battery, thereby making protection of the RAM extremely easy and inexpensive.

Furthermore, if the same control state as that in which the power off switch is actuated by the above hardware means is produced in the reset process when the system is started, since a warning indicating that the battery voltage is lowered is displayed (the warning may be given by speech output), any special input port is unnecessary and the arrangement for monitoring and warning of the battery voltage fall is simple.

Since the protection process can be executed by controlling the operational state of the ON and OFF keys even if there is an output from the switch operated when the IC card or the battery is replaced (switches other than the illustrated slide switch may be used), the protection of the memory during the replacement can be certainly achieved, thus preventing incorrect operations of the apparatus.

Figure 9:
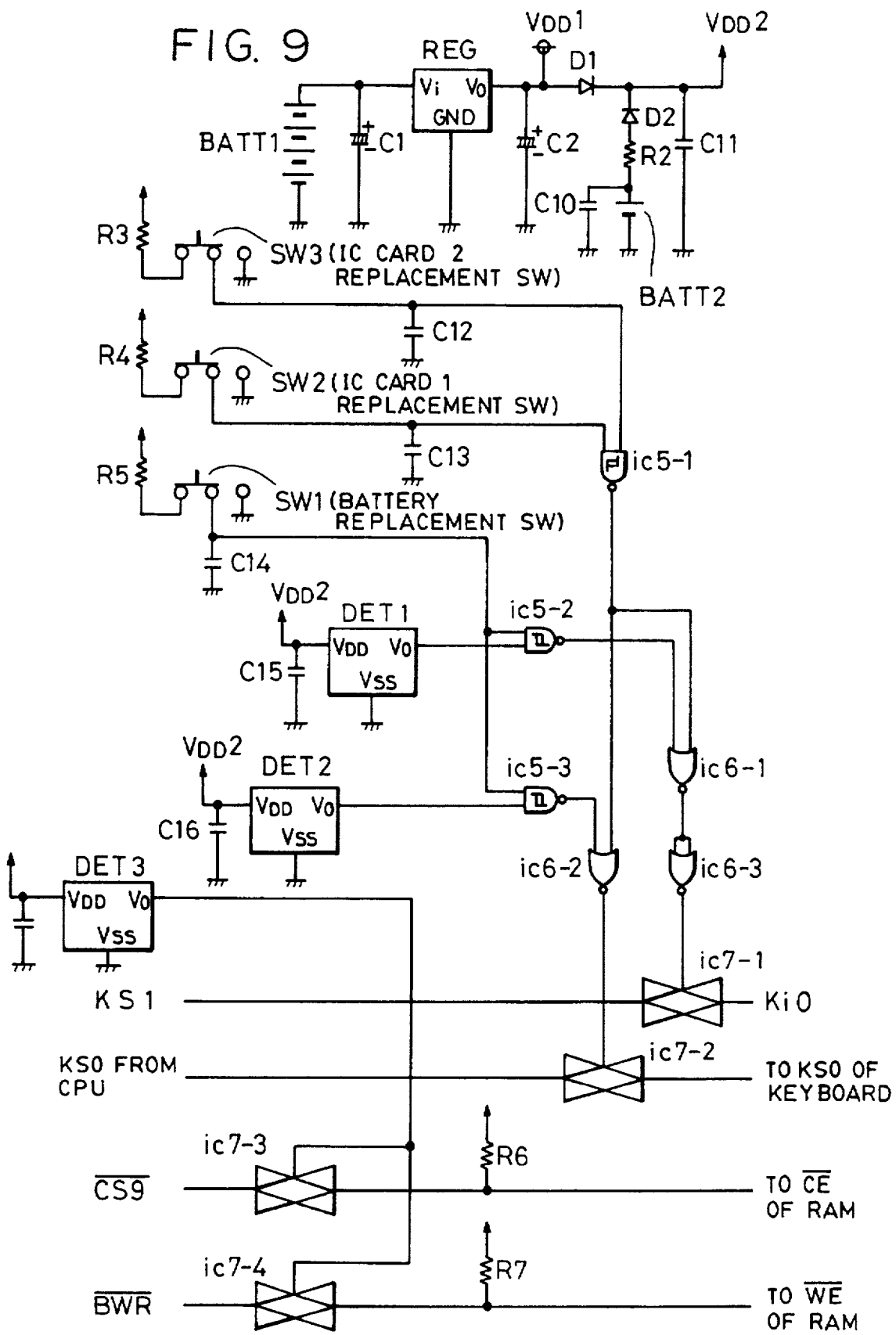
FIGS. 9 and 10 are drawings showing other battery circuitry.
Figure 10:
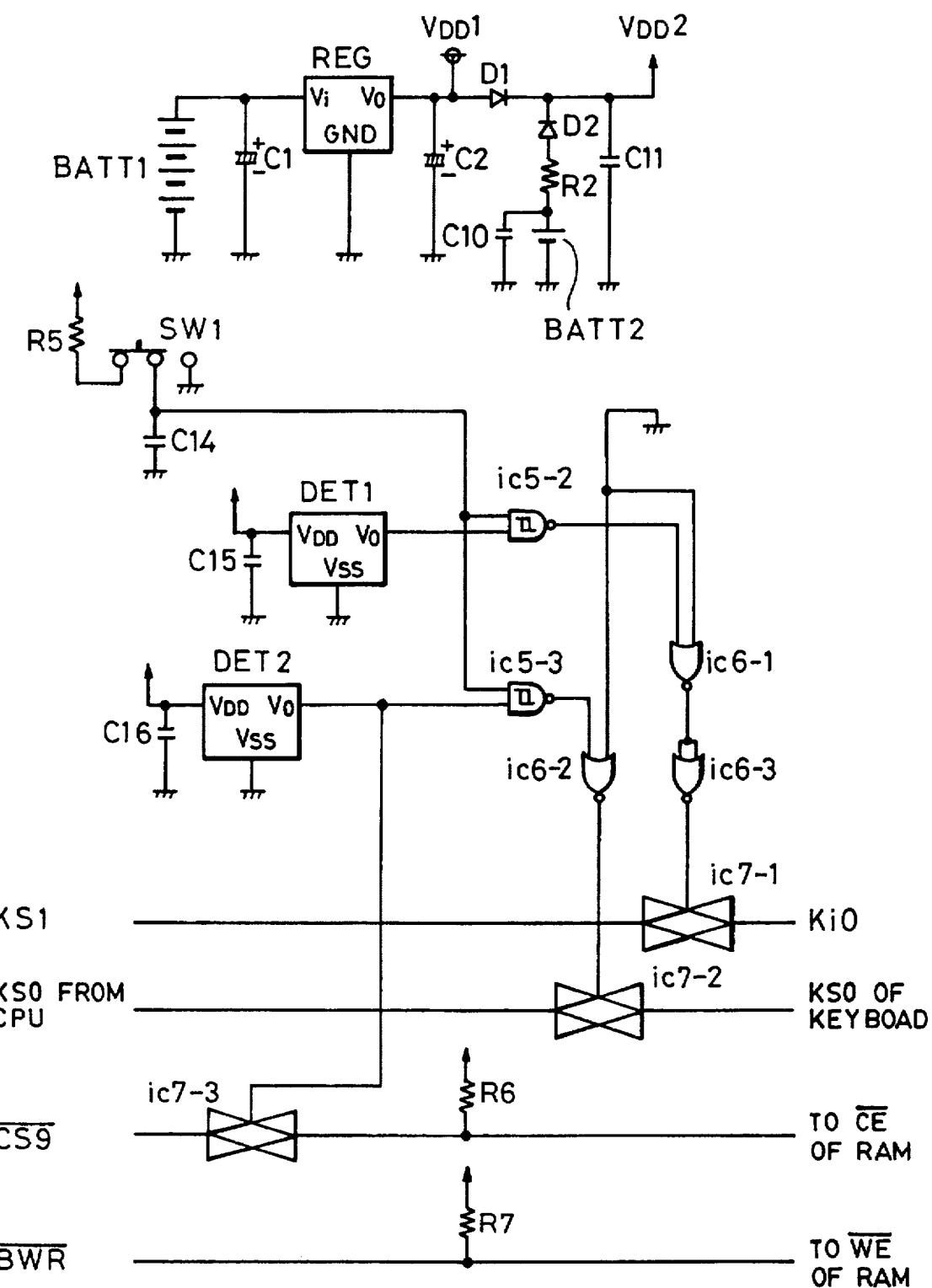

FIGS. 9 and 10 are variations of the above configuration of the electronic apparatus.

Although the analog switches ic7-3 and ic7-4 for protecting the RAM are directly controlled by the output of the detector DET2 in the above description, there is provided a detector DET3 for detecting the battery voltage VDD2 in order to control the analog switches ic7-3 and 7-4 in FIG. 9. The other components are the same as those shown in FIG. 1.

The relationship among VDET1, VDET2 and a detected voltage VDET3 (the output is an inverted voltage) of the third voltage detector DET3 is VDET1> VDET2> VDET3.

The addition of the third voltage detector DET3 results in further protection of the RAM.

Although a slide switch for replacement of the IC card is used in the above embodiment, such a switch is not always in an electronic apparatus which is not an IC card. An embodiment in which the slide switch is omitted is shown in FIG. 10.

In this embodiment, the control of the battery voltage by the voltage detectors DET1 and DET2 and the control when the battery is replaced are performed in the same manner as above.

Figure 11:
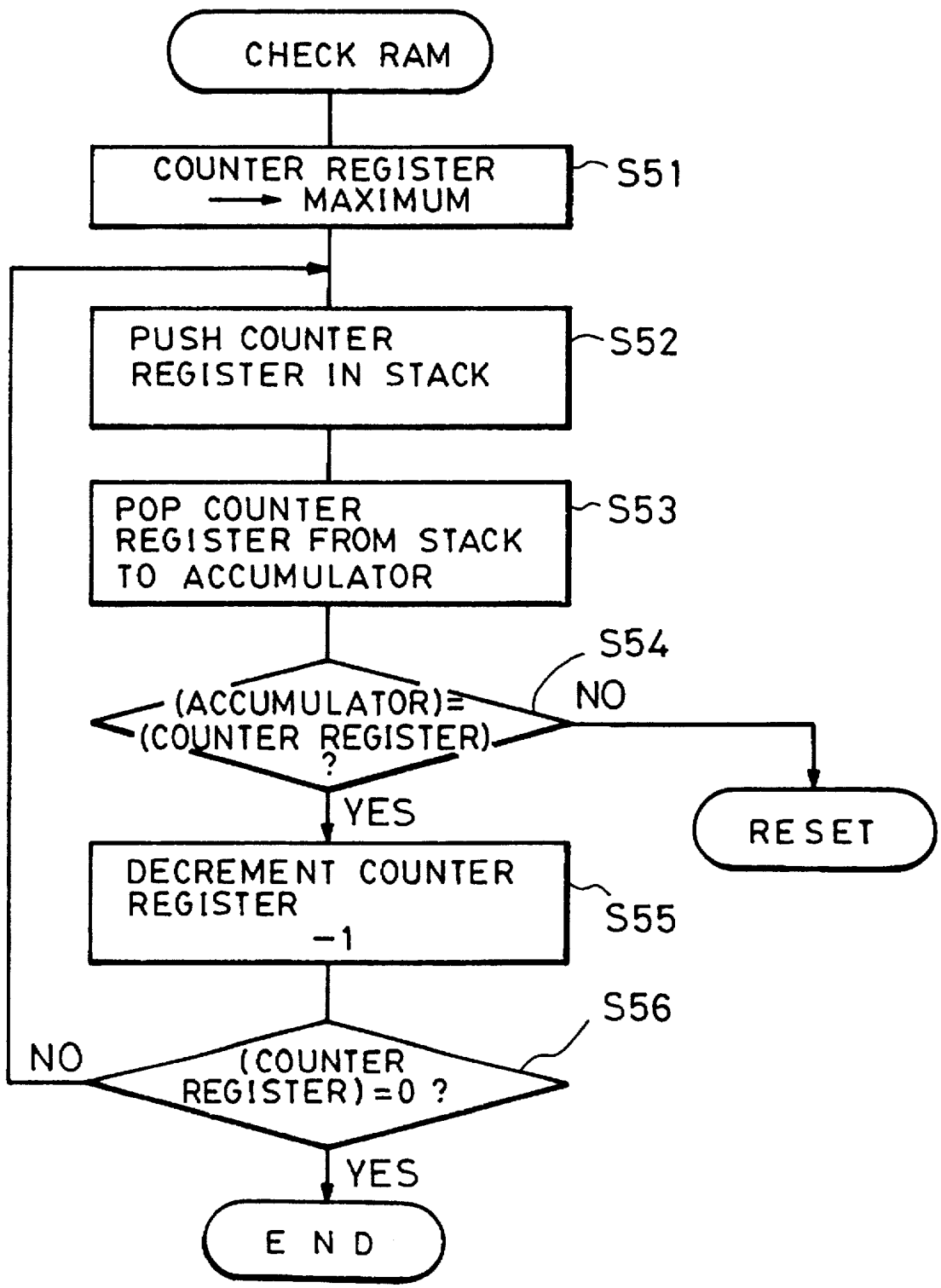
FIG. 11 is a detailed flow chart of another RAM check process.

Although the RAM is checked by confirming the agreement of the data written in the dummy area with the read data in the above embodiment, the correlation of the input and output data in a predetermined address may be performed by repeating pushing down and popping up the data to and from the stack as shown in FIG. 11.

In Step S51 shown in FIG. 11, a predetermined counter register is set at the maximum number (in the case that msb to lsb of one word or one byte as a unit to be pushed/popped is 1), and the contents of the counter register are pushed down/popped up in Steps S52 and S53. At this time, a stack pointer is controlled to point a predetermined address to be checked. The popped data is stored in an accumulator.

In Step S54, the contents of the accumulator and the counter register are correlated. If the contents do not agree, it is determined that an error occurred in the memory and the reset process is executed.

The number of the counter register is decreased in Step S55, and it is checked in Step S56 whether or not the number reaches 0. If the number is not 0, the processes subsequent to Step S52 are repeated.

According to the above processes, all bit patterns can be tested with respect to a word or byte data in one address. The above processes are repeated for each address of the RAM.

As described above, an electronic apparatus, which executes a predetermined protection process when the supply voltage falls below a predetermined voltage, includes a control for controlling a power supply of the apparatus in accordance with the operational state of a power on switch and a power off switch, a first detector for detecting that the supply voltage falls below a first predetermined voltage, a second detector for detecting that the supply voltage falls below a second predetermined voltage lower than the first predetermined voltage, and hardware for producing the same control state as that in which the power off switch is actuated in response to the detection output of the first detector and prohibiting the operation and input of the power on switch in response to the detection output of the second detector. Therefore, a protection process can be performed by detecting the supply voltage with respect to the two predetermined voltages, and forming the same state as that in which the power on or off switch is put into a predetermined condition in accordance with the detection result.

Furthermore, the protection process when the battery voltage falls can be simplified and reliably and easily executed. By using unregulated voltage detectors, the production and operation efficiency is greatly improved, and any special input port which is used in conventional CPU software is unnecessary. In addition, it is possible to produce an apparatus at relatively lower cost than that of the apparatus using a reset IC.

The invention has been described with respect to particular preferred embodiments thereof. It is to be understood, however, that various changes and modifications may be made by those skilled in the art without departing from the spirit and scope of the invention.

What is claimed is:

1. An electronic apparatus having a controlled power supply comprising:

a plurality of keys including a power on switch for turning on the electronic apparatus and a power off switch for turning off the electronic apparatus;

first detection means for detecting that a supply voltage from the power supply falls below a first predetermined voltage in the first detection means and for producing a detection output;

second detection means for detecting that the supply voltage from the power supply falls below a second predetermined voltage in the second detection means lower than said first predetermined voltage and for producing a detection output;

an input circuit, in which at least said power on switch and said power off switch are arranged; and control means for controlling said power supply in accordance with a state of said input circuit;

means for producing a state of said input circuit corresponding to an actuation of said power off switch in response to the detection output of said first detection means;

means for prohibiting said input circuit from having a state corresponding to an actuation of said power on switch in response to the detection output of the second detection means; and means for prohibiting memory access in response to the detection output of said second detection means.

2. An electronic apparatus according to claim 1, further comprising means for checking a memory access state in a reset process when said electronic apparatus is started up and repeating said reset process until a normal memory access is available.

3. An electronic apparatus according to claim 1, further comprising means for checking a memory access state when the electronic apparatus is turned on and performing a transit process to an OFF process when the memory access state is not normal.

4. An electronic apparatus according to claim 1, further comprising means for warning of the fall of the supply voltage if the state corresponding to the actuation of the power off switch is produced when the apparatus is turned on.

5. An electronic apparatus according to claim 1, further comprising:

switch means operated in response to replacement of a memory or replacement of a battery as said power supply; and means for controlling the means for producing the state of said input circuit corresponding to an actuation of said power off switch in accordance with an output of said switch means.

6. An electronic apparatus according to claim 1, further comprising means for prohibiting a memory access in response to a detection output of a third detection means which detects that the supply voltage falls below a third predetermined voltage lower than said second predetermined voltage.

7. An electronic apparatus having a controlled power supply comprising:

means for controlling said power supply in accordance with an operational state of a power on switch for turning on the electronic apparatus and a power off switch for turning off the electronic apparatus;

first detection means for detecting that a supply voltage from the power supply falls below a first predetermined voltage in the first detection means and for producing a detection output;

second detection means for detecting that the supply voltage from the power supply falls below a second predetermined voltage in the second detection means lower than said first predetermined voltage and for producing a detection output;

a plurality of keys;

an input circuit, in which said plurality of keys are arranged; and hardware means, connected with said input circuit, for producing a control state of the electronic apparatus corresponding to an actuation of said power off switch in response to the detection output of said first detection means and prohibition of an operation of the power on switch in response to the detection output of the second detection means;

means for checking a memory access state in a reset process when said apparatus is started up and repeating said reset process until normal memory access is available; and means for prohibiting memory access in response to a detection output of a third detection means which detects that the supply voltage falls below a third predetermined voltage lower than said second predetermined voltage, wherein the detection output produced by said first detection means and second detection means are supplied to said hardware means through said input circuit.

8. An electronic apparatus having a controlled power supply comprising:

means for controlling said power supply in accordance with an operational state of a power on switch for turning on the electronic apparatus and a power off switch for turning off the electronic apparatus;

first detection means for detecting that a supply voltage from the power supply falls below a first predetermined voltage in the first detection means and for producing a detection output;

second detection means for detecting that the supply voltage from the power supply falls below a second predetermined voltage in the second detection means lower than said first predetermined voltage and for producing a detection output;

a plurality of keys;

an input circuit, in which said plurality of keys are arranged; and hardware means, connected with said input circuit, for producing a control state of the electronic apparatus corresponding to an actuation of said power off switch in response to the detection output of said first detection means and prohibition of an operation of the power on switch in response to the detection output of the second detection means;

means for checking a memory access state when the electronic apparatus is turned on and performing a transit process to an OFF process when the memory access state is not normal; and means for prohibiting memory access in response to a detection output of a third detection means which detects that the supply voltage falls below a third predetermined voltage lower than said second predetermined voltage, wherein the detection output produced by said first detection means and second detection means are supplied to said hardware means through said input circuit.

9. An electronic apparatus having a controlled power supply comprising:

means for controlling said power supply in accordance with an operational state of a power on switch for turning on the electronic apparatus and a power off switch for turning off the electronic apparatus;

first detection means for detecting that a supply voltage from the power supply falls below a first predetermined voltage in the first detection means and for producing a detection output;

second detection means for detecting that the supply voltage from the power supply falls below a second predetermined voltage in the second detection means lower than said first predetermined voltage and for producing a detection output;

a plurality of keys;

an input circuit, in which said plurality of keys are arranged; and hardware means, connected with said input circuit, for producing a control state of the electronic apparatus corresponding to an actuation of said power off switch in response to the detection output of said first detection means and prohibition of an operation of the power on switch in response to the detection output of the second detection means;

means for warning of the fall of the supply voltage if the hardware means produces the control state corresponding to the actuation of the power off switch when the apparatus is turned on; and means for prohibiting memory access in response to a detection output of a third detection means which detects that the supply voltage falls below a third predetermined voltage lower than said second predetermined voltage, wherein the detection output produced by said first detection means and second detection means are supplied to said hardware means through said input circuit.

10. An electronic apparatus having a controlled power supply comprising:

means for controlling said power supply in accordance with an operational state of a power on switch for turning on the electronic apparatus and a power off switch for turning off the electronic apparatus;

first detection means for detecting that a supply voltage from the power supply falls below a first predetermined voltage in the first detection means and for producing a detection output;

second detection means for detecting that the supply voltage from the power supply falls below a second predetermined voltage in the second detection means lower than said first predetermined voltage and for producing a detection output;

a plurality of keys;

an input circuit, in which said plurality of keys are arranged; and hardware means, connected with said input circuit, for producing a control state of the electronic apparatus corresponding to an actuation of said power off switch in response to the detection output of said first detection means and prohibition of an operation of the power on switch in response to the detection output of the second detection means;

switch means operated in response to replacement of a memory or replacement of a battery as said power supply;

means for controlling the hardware means in accordance with an output of said switch means; and means for prohibiting memory access in response to a detection output of a third detection means which detects that the supply voltage falls below a third predetermined voltage lower than said second predetermined voltage, wherein the detection output produced by said first detection means and second detection means are supplied to said hardware means through said input circuit.

11. An electronic apparatus comprising:

first switch means for detecting a replacement of a card in the electronic apparatus and outputting a signal;

second switch means for detecting a replacement of a battery in the electronic apparatus and outputting a signal;

first voltage detection means for detecting an output voltage of said battery being lower than a first voltage in the first voltage detection means and outputting a signal;

second voltage detection means for detecting the output voltage of said battery being lower than a second voltage in the second voltage detection means which is lower than said first voltage and outputting a signal;

input means having a plurality of input devices;

means accordance with a state of said input means supplied with signal outputs from said first switch means, said second switch means and said first voltage detection means;

means for prohibiting said power supply from being turned on in response to the signal outputs from said first switch means, said second switch means and said second voltage detection means; and means for prohibiting memory access in response to the detection output of said second voltage detection means.

12. An electronic apparatus having a controlled power supply, comprising:

first switch means for detecting a replacement of a card in the electronic apparatus and outputting a signal;

second switch means for detecting a replacement of a battery in the electronic apparatus and outputting a signal;

first voltage detection means for detecting an output of said battery being lower than a first voltage in said first voltage detection means and outputting a signal;

second voltage detection means for detecting an output of said battery being lower than a second voltage in the second voltage detection means which is lower than said first voltage and outputting a signal;

input means having a plurality of input devices;

first logic means, connected with said input means, for controlling turn-off of said power supply in response to signal outputs of said first switch means, said second switch means and said first voltage detection means, said first logic means being supplied with the signal outputs of said first switch means, said second switch means and said first voltage detection means;

second logic means for prohibiting said power supply from being turned on in response to the signal outputs of said first switch means, said second switch means and said second voltage detection means; and means for performing control operations in order to prohibit access to said card in response to at least one of the signal output from said second voltage detection means and a signal output from a third voltage detection means which detects said battery voltage being lower than a third voltage in the third voltage detection means which is lower than said second voltage.

13. An electronic apparatus comprising:

switch means for detecting a replacement of a battery in the electronic apparatus and at least one switch for outputting a signal;

first voltage detection means for detecting an output voltage of said battery being lower than a first voltage in the first voltage detection means and outputting a signal;

second voltage detection means for detecting the output voltage of said battery being lower than a second voltage in the second voltage detection means which is lower than said first voltage and outputting a signal;

input means having a plurality of input devices in which the at least one switch is arranged;

means for turning off said power supply in accordance with a state of said input means supplied with the signal outputs from said switch means and said first voltage detection means;

means for prohibiting said power supply from being turned on in response to the signal outputs from said switch means and said second voltage detection means; and means for performing control operations in order to prohibit access to a random access memory in response to the signal output from said second voltage detection means.

14. An electronic apparatus having a controlled power supply comprising:

a plurality of keys for entering data signals, a power on signal for turning on the electronic apparatus and a power off signal for turning off the electronic apparatus;

first detection means for detecting that a supply voltage from the power supply falls below a first predetermined voltage in the first detection means and for producing a detection output;

second detection means for detecting that the supply voltage from the power supply falls below a second predetermined voltage in the second detection means lower than said first predetermined voltage and for producing a detection output;

an input circuit in which at least one of said plurality of keys for entering said power on signal and said power off signal is arranged;

control means for controlling said power supply in accordance with a state of said input circuit;

means for producing a state of said input circuit corresponding to an input of said power off signal in response to the detection output of said first detection means;

means for prohibiting said input circuit from having a state corresponding to an input of said power on signal in response to the detection output of the second detection means; and means for prohibiting memory access in response to the detection output of said second detection means.

* * * * *